US009319246B2

(12) United States Patent
Vasu et al.

(10) Patent No.: US 9,319,246 B2
(45) Date of Patent: Apr. 19, 2016

(54) VOICE-OVER-INTERNET PROTOCOL (VOIP) APPLICATION PLATFORM

(75) Inventors: Vij Vasu, Redmond, WA (US); Akhilesh Kaza, Sammamish, WA (US); Shawn Henry, Seattle, WA (US); Eric Bie, Duvall, WA (US); Lucia Darsa, Clyde Hill, WA (US); Tony Seeley, Redmond, WA (US); Keith Kaplan, Bothell, WA (US); Steve Serdy, Sammamish, WA (US); Vishal Ghotge, Seattle, WA (US); Syed Mansoor Jafry, Kirkland, WA (US); Nimesh Amin, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 544 days.

(21) Appl. No.: 13/532,704

(22) Filed: Jun. 25, 2012

(65) Prior Publication Data

US 2013/0343373 A1    Dec. 26, 2013

(51) Int. Cl.
*H04L 12/66* (2006.01)
*G06F 3/048* (2013.01)
*H04L 29/06* (2006.01)
(Continued)

(52) U.S. Cl.
CPC ............... *H04L 12/66* (2013.01); *G06F 3/048* (2013.01); *H04L 65/00* (2013.01); *H04L 65/1053* (2013.01); *H04L 65/80* (2013.01); *H04M 1/00* (2013.01); *H04M 3/00* (2013.01); *H04M 1/2535* (2013.01)

(58) Field of Classification Search
CPC . H04L 41/22; H04L 65/1016; H04L 65/1046; H04L 12/66; H04L 65/1053; H04L 65/80; H04L 65/00; H04M 1/2535; H04M 7/006; H04M 15/56; H04M 3/4283; H04M 1/00; H04M 7/0003; H04M 7/0006; H04M 3/00; H04W 4/14; H04W 4/16
USPC .................. 370/352, 263, 313, 311; 718/106
See application file for complete search history.

(56) References Cited

U.S. PATENT DOCUMENTS 6,954,800 B2    10/2005  Mallory
7,058,568 B1    6/2006   Lewis (Continued)

OTHER PUBLICATIONS

Author Unknown, "iOS App Programming Guide" Retrieved at <<http://developer.apple.com/library/ios/DOCUMENTATION/iPhone/Conceptual/iPhoneOSProgrammingGuide/iPhoneApp-ProgrammingGuide.pdf>>, Mar. 7, 2012, pp. 137.

(Continued)

*Primary Examiner* — Anh Ngoc Nguyen
*Assistant Examiner* — Syed M Bokhari
(74) *Attorney, Agent, or Firm* — Judy Yee; Micky Minhas (57) ABSTRACT

A computer-implemented system is provided that facilitates implementation of a voice over IP (VOIP) application. The system includes a host system and a user interface (UI) host process residing on the host system. The system also includes an agent host process residing on the host system which is being configured to process a VOIP call received by one or more VOIP applications executable on the host system. The agent host process running as a foreground or background process for the duration of the VOIP call to (i) communicate with a VOIP server associated with the VOIP application, (ii) capture content from at least one input device associated with the host system and (iii) render content on an output device associated with the host system when an instance of the UI host process operates in the foreground.

20 Claims, 4 Drawing Sheets

(51) Int. Cl.
*H04M 1/00* (2006.01)
*H04M 3/00* (2006.01)
*H04M 1/253* (2006.01)

(56) References Cited

U.S. PATENT DOCUMENTS

| | | | |
|---|---|---|---|
| 7,266,127 | B2 | 9/2007 | Gupta et al. |
| 7,751,848 | B2 | 7/2010 | Vishwanathan et al. |
| 7,817,792 | B2 | 10/2010 | Chu |
| 8,077,657 | B2 | 12/2011 | Venkatachalam et al. |
| 8,930,492 | B2 | 1/2015 | Brown et al. |
| 2002/0110089 | A1 | 8/2002 | Goldshtein et al. |
| 2005/0190747 | A1* | 9/2005 | Sindhwani et al. ........... 370/352 |
| 2005/0265284 | A1 | 12/2005 | Hsu et al. |
| 2007/0005544 | A1 | 1/2007 | Joanovic et al. |
| 2007/0133514 | A1* | 6/2007 | Nelson ........................ 370/352 |
| 2008/0107045 | A1* | 5/2008 | Berstis et al. ................. 370/263 |
| 2008/0253313 | A1* | 10/2008 | Carlton et al. ................. 370/313 |
| 2009/0210929 | A1 | 8/2009 | Zill et al. |
| 2009/0327094 | A1 | 12/2009 | Elien et al. |
| 2010/0039971 | A1* | 2/2010 | Lor et al. ...................... 370/311 |
| 2010/0284398 | A1* | 11/2010 | Maeng et al. ................. 370/352 |
| 2011/0060586 | A1 | 3/2011 | Dhawan et al. |
| 2011/0179303 | A1 | 7/2011 | Taylor et al. |
| 2011/0252430 | A1* | 10/2011 | Chapman ............... G06F 9/485 718/107 |
| 2012/0023190 | A1 | 1/2012 | Backholm et al. |
| 2014/0040975 | A1 | 2/2014 | Raleigh et al. |

OTHER PUBLICATIONS

Goldman, Oliver., "Considerations for developing Adobe AIR applications for mobile", Retrieved at <<http://www.adobe.com/devnet/air/articles/considerations-air-apps-mobile.html>>, Retrieved Date: Apr. 10, 2012, pp. 10.

Author Unknown, "How to set background connectivity options", Retrieved at <<http://msdn.microsoft.com/en-us/library/windows/apps/hh771189.aspx>>, Retrieved Date: Apr. 10, 2012, pp. 19.

Author Unknown, "Multitasking in Bada", Retrieved at <<http://developer.bada.com/help/index.jsp?topic=/com.osp.documentation.help/html/bada_overview/bada_app_model/multitasking_in_bada.htm>>, Retrieved Date: Apr. 10, 2012, pp. 2.

Mehta, et al., "Overview of Voice over IP", Retrieved at <<http://www.coe.montana.edu/ee/rwolff/EE548/papers/VoIP/upenn_Overview_VoIP.pdf>>, Feb. 2001, pp. 36.

Author Unknown, "Voice Quality beyond IP QoS", Retrieved at <<http://www.ditechnetworks.com/learningcenter/whitepapers/wp_voip_voice_quality.pdf>>, Jan. 2007, pp. 12.

Shin, et al., "Reducing MAC Layer Handoff Latency in IEEE 802.11 Wireless LANs", Retrieved at <<http://citeseerx.ist.psu.edu/viewdoc/download?doi=10.1.1.93.5736&rep=rep1&type=pdf>>, Proceedings of MobiWac'04 Proceedings of the second international workshop on Mobility management & wireless access protocols, Oct. 1, 2004, pp. 19-26.

\* cited by examiner

VOICE-OVER-INTERNET PROTOCOL (VOIP) APPLICATION PLATFORM

BACKGROUND

Developing voice-over-Internet protocol (VOIP) applications to run on a mobile phone or other limited resource devices (e.g., tablets, personal digital assistants) presents a number of challenges. These challenges are even greater when the VOIP applications are to scale so that they are operational on low end hardware devices having limited resources as well as high end hardware devices having greater resources, particularly when the quality of the VOIP call user experience is to remain relatively high in all cases.

One peculiarity of a mobile phone as a platform for a VOIP application, as opposed to a personal computer, tablet or the like, is that that a mobile phone has a pre-existing telephony (e.g., cellular) module already built into it. Thus, when developing a VOIP application for a mobile phone, issues arise such as switching between different types of calls, which do not arise when a personal computer or tablet is used as a platform for the VOIP application. More generally, it becomes desirable to integrate the user experience of receiving and placing all types of calls, including VOIP calls and cellular or other types of calls that are native to the mobile phone.

Another problem that arises when developing a VOIP application that does not arise with other types of calls native to the mobile phone or other limited resource devices concerns the sharing of hardware resources (e.g., processing capability, memory) among various applications. If, for example, a user switches to another application while on a VOIP call, hardware resources are allocated to the other application which may negatively impact the VOIP call user experience.

SUMMARY

A system and method is provided that facilitates the development and operation of original equipment manufacturer (OEM) and third-party VOIP applications on a host system. In some embodiments a platform for running VOIP applications is provided for a mobile (e.g., cellular) phone that serves as the host system. The platform allows VOIP applications to be developed which scale with the hardware resources of the host system while preserving the quality of the VOIP call user experience on both low end and high end host systems.

In one particular implementation, the VOIP platform is partitioned into different processes in order to conserve resources and minimize the impact on battery life. One process implements UI functions and only runs when the UI is being used and the other process implements call processing functionality and runs whenever a VOIP call is in progress. That is, a UI host process may run in the foreground while an agent host process runs in the background, when the application is not displaying any UI. Thus, all of the code in the VOIP application that needs to run in the background will run in the agent host process and all code related to the UI of the VOIP application will run in the UI host process.

In yet another particular implementation, in order to further conserve resources and battery life a push client service that is pre-existing on the host system may be used to notify the agent host process that an incoming VOIP call is being received. In addition, a keep-alive agent may be provided for ensuring that the push notification channel used by the push client service remains active, as well as for periodically communicating with the cloud service associated with the VOIP application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Overview

Simplified overviews are provided in the present section to help enable a basic or general understanding of various aspects of exemplary, non-limiting embodiments that follow in the more detailed description and the accompanying drawings. This overview section is not intended, however, to be considered extensive or exhaustive. Instead, the sole purpose of the following embodiment overviews is to present some concepts related to some exemplary non-limiting embodiments of the disclosed subject matter in a simplified form as a prelude to the more detailed description of these and various other embodiments of the disclosed subject matter that follow. It is understood that various modifications may be made by one skilled in the relevant art without departing from the scope of the disclosed subject matter. Accordingly, it is the intent to include within the scope of the disclosed subject matter those modifications, substitutions, and variations as may come to those skilled in the art based on the teachings herein.

As used in this application, the term "host" generally refers to a computer or a computer-related entity at a specific location on a computer network. Typically, a host can comprise a storage component (e.g., volatile and non-volatile storage and associated software for storage and/or execution of data and/or instructions), a host central processing unit (CPU) (e.g., for controlling the functions of the host according to data and/or instructions), and a communications component (e.g., one or more network devices and associated software for communication with other network components). In addition, a location on a network can be described by an IP address. Thus, in addition to including such computer-related entities as desktop computers, laptop computers, server computers, network attached appliances with computing capability, and so on, the term host can include, for example, a tablet personal computer (PC) device, a Smartphone, and/or a personal digital assistant (PDA), and so on.

Furthermore, as used in this application, the terms "component," "process", "module," "system," and the like generally refer to a computer-related entity, either hardware, firmware, a combination of hardware and software, software, software in execution, firmware, middle ware, microcode, and/or any combination thereof. For example, a component can be, but is not limited to being, a process running on a processor, a processor, an object, an executable, a thread of execution, a program, and/or a computer. By way of illustration, not limitation, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

Figure 1:
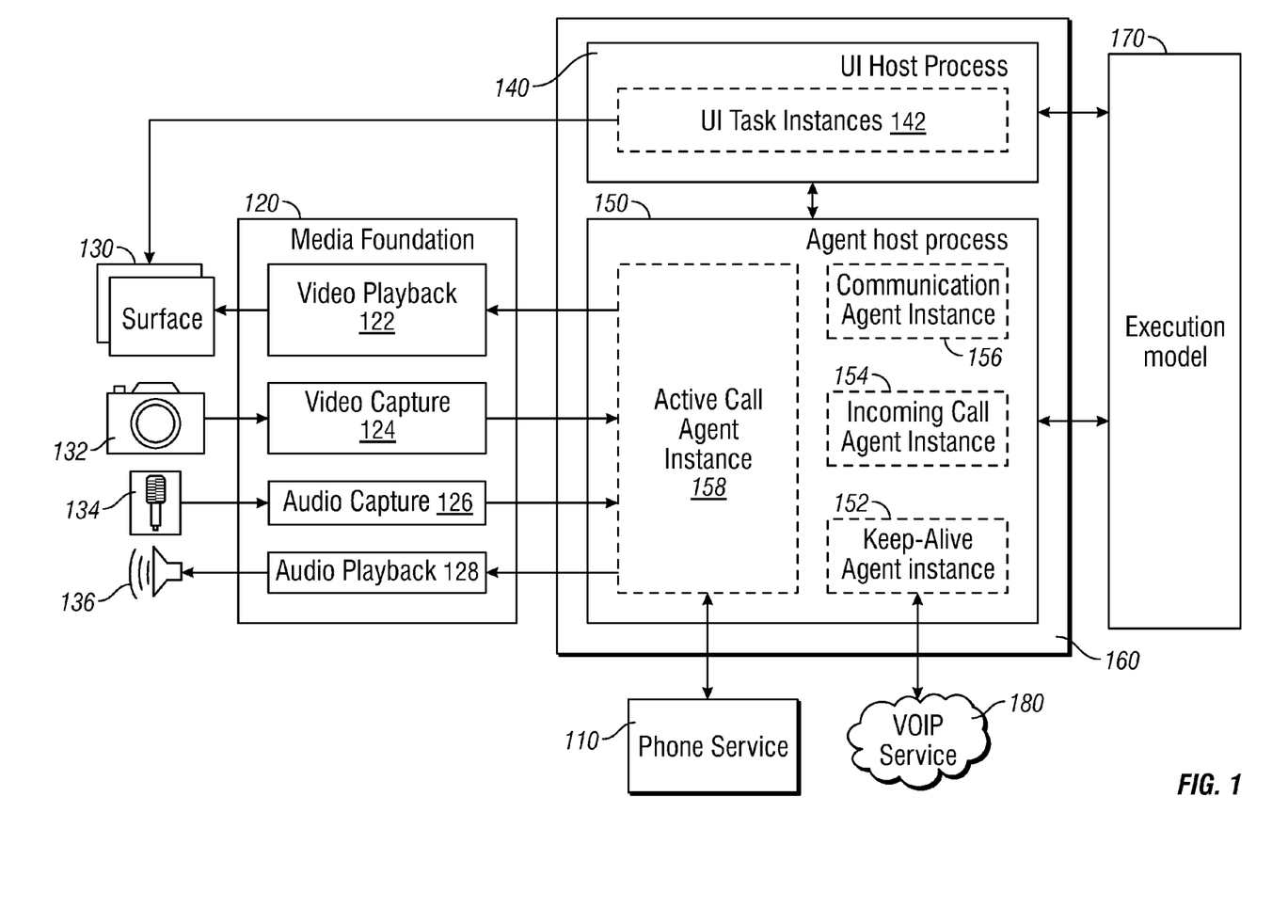
FIG. 1 illustrates one example of the various tasks and processes associated with a VOIP application platform running on a host system.

Additional terminology as used herein is as follows.
Application
An "application" is a unit of installation and not a run-time entity. It consists of a set of binaries and file installed onto the phone. An application is a security principal and, at run-time, all binaries of an application are loaded only in processes that are running in the security context of the application.
Task
A "task" is logical unit of functionality in the application model. All applications (both first and third-party) are made up of one or more tasks. A task can be thought of as an entry point into an application.
Task Instance
A "task instance" is a task that is being executed. A task instance is a run-time entity. Task instance is to task, as process is to executable file. A task instance can be thought of as a unit of work being done by the application code at run time.
Host
A "host" is a process that contains one or more task instances of a single application. All host processes for an application run under the security context of the application.
UI Task
A "UI task" is a task that is capable of displaying UI.
Agent
An "agent" is a task that is not capable of displaying UI.
UI Host Process
A "UI host process" is a host process that only contains task instances that display UI.
Agent Host Process
An "agent host process" is a host process that can only contain background agents. An agent host process may also be referred to as a headless host process.
VOIP
"VOIP" is an acronym for Voice over Internet Protocol. As used herein, a VOIP application is an application that enables either voice-only or voice and video and/or text or other data over the internet.
VOIP Application Platform
FIG. 1 illustrates one example of the various tasks and processes associated with a VOIP application platform running on a host system. In this example the host system is a mobile phone that includes such well-known components as a media foundation and an execution model. The VOIP application 160 includes a UI host process 140 and an agent host process 150.

In those implementations in which the host system is a mobile phone, a number of components and services are already available which may be used by the VOIP application platform. These components and services are used to facilitate the provision of cellular phone service and may be extended to additionally facilitate the provision of VOIP services. Three such components and services are shown in FIG. 1.

One service made available by the host system is a phone service 110, which serves as the authority on the state of all calls currently existing on the phone (starting, ending, on hold, ringing, etc.). It provides the functionality needed to switch between calls and to handle multiple calls at the same time. The phone service 110 also sends out notifications about call states to other interested first party components of the system. It provides APIs to display the incoming call dialog and to control audio routing for calls, which specify, for example, whether the audio is to be captured or played back from a Bluetooth headset or whether the phone speaker is to be used for call audio output. In addition, the phone service 110, in conjunction with the UI shell 202 (discussed below), is responsible for the display of a minimized call UI when the primary call UI is not in the foreground.

Another set of services and components made available by the host system is the media foundation 120. The media foundation, which may include hardware and software components, exposes one or more application program interfaces (APIs) that can be called by the VOIP application to interact with audio, video or other media. For example, the media foundation 120 may be thought of as existing at an "infrastructure" level of software that is executed on the host system. In other words, the media foundation 120 is a software layer used by the VOIP application to interact with the media. The media foundation 120 may be utilized to control a number of aspects of the media, such as output, rendering, storage, and so on. Thus, the media foundation 120 may be utilized such that each application does not have to implement separate code for each type of media that may be used in the system. In this way, the media foundation provides a set of reusable software components to do media specific tasks.

In particular, the media foundation 120 primarily provides the audio and video capture and playback APIs for use by the active call agent instance. In FIG. 1 the media foundation 120 includes a video playback component 122, a video capture component 124, an audio capture component 126 and an audio playback component, which respectively communicate with the display surface 130, camera 132, microphone 134 and speaker 136 of the host system. Its video playback pipeline allows the agent host process 150 to output a raw or hardware decoded H.264 incoming video stream directly to a surface created by the UI host process 140, with the minimum number of buffer copies. In this way, displaying video that is being rendered by the agent host process 150 will be as efficient as rendering it from the UI host process 140.

The execution model 170 is another pre-existing component of the host system which can be used to provide APIs to launch and control instances of the various types of VOIP agents described herein. A subcomponent of the execution model 170, referred to as the resource manager, may also be responsible for the management and allocation of resources (e.g., CPU, memory, access to devices, etc.) used by the UI and agent host processes of the VOIP applications. The execution model 170 can multiplex the resource utilization by various applications running on the host system so as to optimize the overall resource utilization. For example, the execution model 170 can reallocate resources used by instances of a background audio playback agent to an active call agent instance 158 since there is no need to play music when a phone call is in progress. The execution model 170 may also provide scheduling logic to initiate background activity in a battery-friendly manner. For instance, keep-alive agent 152 instances may be scheduled together with generic background agents in order to minimize the amount of time the network radios are active.

With continuing reference to FIG. 1, execution of the VOIP application platform 160 is divided into two primary processes, a UI host process 140 and an agent host process 150. The UI host process 140 runs in the foreground while the agent host process 150 runs in the background, when the application is not displaying any UI. Thus, all of the code in the VOIP application that needs to run in the background will run in the agent host process 150 and all code related to the UI of the VOIP application will run in the UI host process 140. Generally, the background process is always running to ensure that there are no dropped calls.

Background, or headless, execution of VOIP application code is employed for several reasons. First, as discussed below, background execution allows keep-alive messages to be periodically sent to the appropriate VOIP server. Background notification also allows incoming call notifications to be processed. While processing incoming call notifications, the application that is currently in the foreground is not interrupted. The VOIP application may display the UI only if the user accepts the incoming call. If the user declines the call, the current foreground application continues without interruption. Background execution is also employed to process a VOIP call that is in progress when the VOIP application UI is not in the foreground. This scenario can occur either when the user accepts an incoming VOIP call and the screen is locked (i.e., a state in which at least some normally user-accessible functions of the device are not user-accessible), or when the user navigates away from the VOIP application UI in the middle of a VOIP call.

The partitioning of the VOIP application platform 160 into two primary processes is advantageous for a number of reasons. In particular, this arrangement facilitates the implementation of VOIP applications on lower end, resource limited devices because each process can run only when necessary, thereby avoiding the need to have one large process consuming resources at all times. For instance, the UI host process 140 will generally consume substantially more resources than the agent host process 150 in order to handle UI functions such as the rendering of surfaces, buttons and the like as well as the rendering of video. The UI host process 140 is only executed when in the foreground since otherwise it is not being utilized. For instance, when the user switches away (e.g., places on hold) from a VOIP call that is in progress to accept a cellular call or access another application for instance, the UI host process 140 may be terminated. The agent host process 150, on the other hand, is generally a much smaller process that consumes fewer resources than the UI host process 140. The agent host process 150 is not terminated even if the UI host process 140 is terminated. Moreover, in some cases the foreground process may sponsor memory to the background process, thus reducing the size of the background process unless necessary.

The agent host process 150 runs whenever the VOIP application is to operate in the background. That is, the agent host process 150 runs whenever any agent instance is running in it. In particular, the agent host process 150 runs for the duration of a VOIP call as well as generally whenever the UI host process 140 is running in the foreground. Among other things, code runs in the agent host process 150 which is responsible for communicating with the VOIP service 180. All communication with the VOIP service 180 occurs from the agent host process 150, even when the UI host process 140 is in the foreground. The agent host process 150 also captures video from the camera 132 (if available in the platform) and renders it directly into the camera's preview surface, which is created by the UI host process 140. Likewise, the agent host process 150 also decodes incoming video and renders it directly into an incoming video surface created by the UI host process 140. The agent host process 140 also captures and encodes outgoing audio from the pertinent audio input device and receives, decodes and plays back incoming audio to the pertinent audio output device. It should be noted that there is no audio or video data being transferred between the UI host process 140 and the agent host process 150.

As shown in FIG. 1, the agent host process 150 includes a keep-alive agent 152, an incoming call agent 154, a communication agent 156 and an active call agent 158. The agents essentially serve as an entry point that is invoked by the execution model to perform different types of work. Each of these agents will be described in turn.

The purpose of the keep-alive agent 152 is two-fold. First, it periodically informs the VOIP cloud service 180 that this endpoint is still connected For example, this agent can be used to renew any authorization tokens that the VOIP cloud service 180 may have issued to this particular endpoint. Second, the keep-alive agent 152 ensures that the push notification channel (discussed below) over which incoming call notifications are sent is still active. If not, it creates a new push notification channel and registers it with the background scheduling service 206 (discussed below) and with its own cloud service. In order to conserve resources and battery life, the keep-alive agent 152 is small and lightweight; it starts, performs its operation and shuts down quickly.

The purpose of the incoming call agent 154 is to receive information about an incoming VOIP call. In response, the incoming call agent 154 requests the phone service to display the incoming call dialog box, appropriately customized with information about the incoming call.

An instance of the incoming call agent 154 is launched or otherwise started by the background scheduling service 206 when it receives a push notification on the notification channel previously registered by the VOIP application for this purpose. The incoming call agent 154 is generally small and lightweight—it is expected to start as soon as possible upon receipt of incoming VOIP call, retrieve information about the incoming call from the incoming push notification or the VOIP cloud service, and request the phone service 110 to display the incoming call dialog box. If the incoming call agent 154 does not request the phone service to display the incoming call dialog box within a specified amount of time (e.g., 5 seconds) of being started, it may be canceled. If the user declines the call, the incoming call agent 154 is shut down by the execution model.

If the user accepts the call, the incoming call agent 154 requests the phone service 110 to start a call. The phone service 110, in turn, requests the execution model 170 to start an active call agent instance to handle the new call. The execution model 170 starts the active call agent instance in the same agent host process 150 as the incoming call agent instance. The execution model 170 then requests the incoming call agent instance to shut down. The agent host process 150 then continues to run with the active call agent instance inside it.

The incoming call agent instance briefly shares its host process with the active call agent instance that is requested, if any. This is significant because the incoming call agent instance may have state information (e.g., open sockets to its service, call routing information, etc.) that it wishes to share with the nascent active call agent instance—having both instances share the same process makes this sharing easier.

The purpose of the active call agent 158 is to perform the functionality used during a VOIP call, both when the UI of the VOIP application is in the foreground, and when it is not. In the former case, the active call agent 158 processes both video and audio information, and in the latter, it processes only audio information. An instance of this agent is started by the phone service when a VOIP call is started. A call can be started either by an incoming call agent instance (when the user accepts an incoming call) or by the communication agent task instance 156 (when the user initiates an outgoing call from the VOIP application UI).

The active call agent 158 may continuously communicate with the VOIP cloud service 180 to send and receive audio-video streams and call control information. It communicates with the phone service 110 to deliver notifications about call status and to receive call control commands (for instance, commands to put the call on hold when accepting another call or commands to end the call). The active call agent 158 uses media foundation APIs to:
 1. Capture audio from the selected audio input device
 2. Play incoming audio out to the selected audio output device
 3. Capture video directly from the selected camera or via the video encoding pipeline
 4. Play video to a surface created by the UI task instance 142 either directly or via the video decoding pipeline Video capture and playback is performed only if the UI task instance 142 of the VOIP application is in the foreground.

VOIP applications sometimes need to communicate with their affiliated cloud service to retrieve data for the UI, even when there is no VOIP call in progress. For example, the VOIP application may be requested to display a list of contacts in its UI, and would therefore need to communicate with its cloud service to retrieve this list. However, many VOIP applications are not resilient to having multiple instances of their communication libraries coexisting at runtime. Instantiating its communication library in the UI process, and then again in the agent process, would violate this constraint. To solve this problem, the communication agent 156 can be used. An instance of this agent can be launched directly by the UI task instance 142 of the VOIP application. The UI task instance 142 can then communicate with the VOIP application's cloud service via the communication agent instance, thereby avoiding the problem of having to instantiate the communication library in both the UI and the agent host processes. The communication agent instance of a VOIP application, if any, is shut down by the execution model as soon as the UI task instance 142 of the application goes out of the foreground.

The UI task instance 142 contains the UI used to initiate and control VOIP calls. The UI task instance 142 also displays incoming video and video capture previews from the camera. When a VOIP call is in progress, the UI task instance 142 communicates with the active call agent instance to deliver call control commands. It also creates two surfaces—one for the active call agent to render the incoming video stream into, and another for the camera driver to render the capture preview into.

Host System

Figure 2:
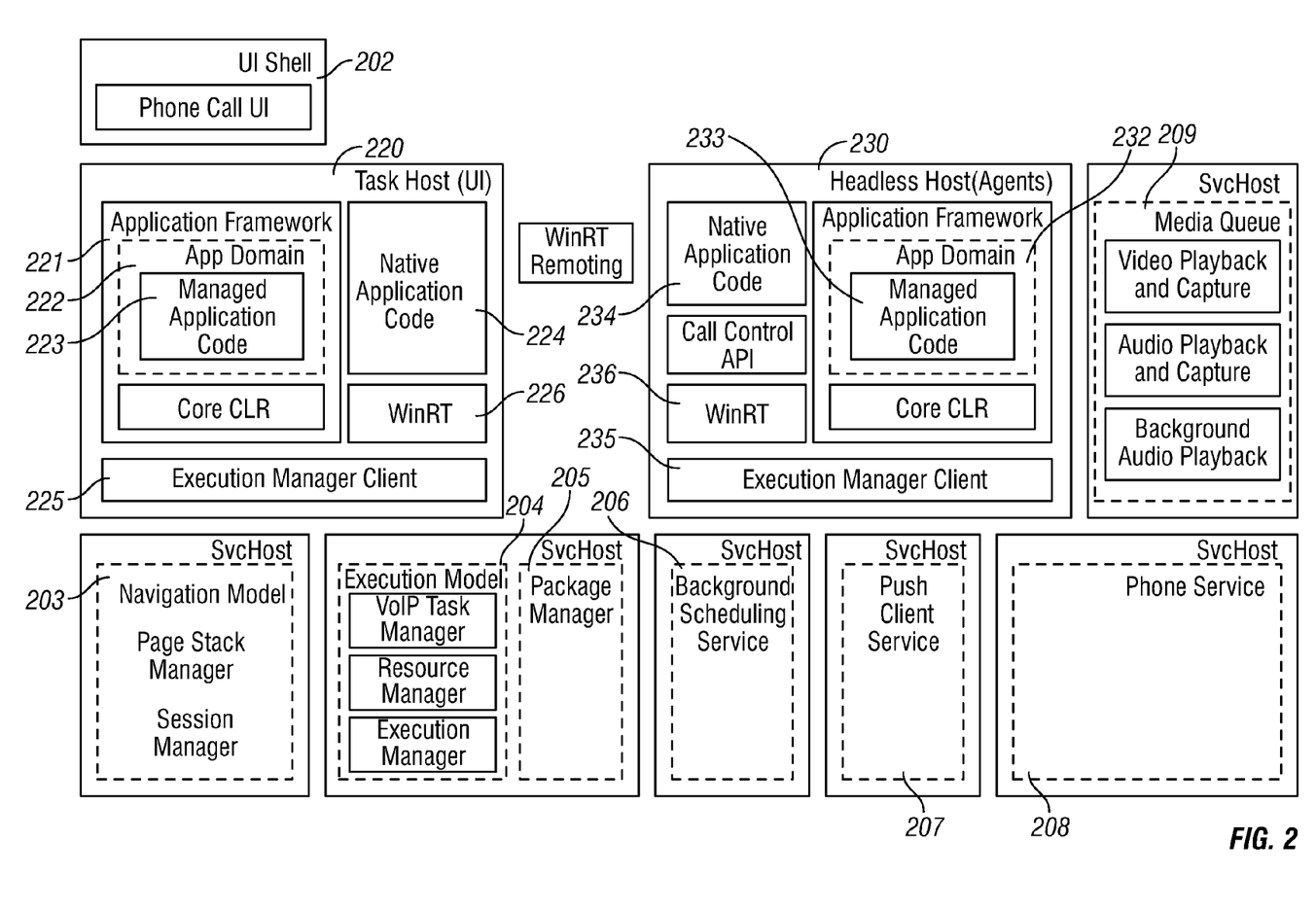
FIG. 2 shows the architecture of one example of a host system on which one or more VOIP applications may be executed.

FIG. 2 shows the architecture of one example of a host system on which one or more VOIP applications may be executed. The host system includes a number of components that may provide services to the VOIP application platform, including a UI shell 202 (in the case of a mobile phone host system) and a number of service hosts, including a navigation model 203, execution model 204 and package manager 205, a background scheduling service 206, a push client service 207, a phone service 208 and a media queue 209. The background scheduling service 206, push client service 207 and the phone service 208 have been discussed above in connection with FIG. 1. The media queue 209 largely corresponds to the media foundation. OEM and/or third party application code is largely included in the UI task host 220 and the headless host 230 agents, which is built upon the VOIP platform, e.g., the aforementioned services and APIs associated therewith which are exposed by those services.

The UI task host 220 functions to render content from input that is provided to it. Managed application code 223 incorporates the UI Host process of FIG. 1 and executes within an application framework 221 such as Microsoft Silverlight®, which includes an application domain 222 such as Microsoft's common language runtime (CLR). The UI task host 220 may also include native application code 224, an execution manager client 225 and a runtime environment such as the Windows® Runtime (WinRT) Platform 226 to communicate with other processes.

The headless host 230 functions to transport and track content. Managed application code 223 incorporates the agent host process of FIG. 1 and executes within an application framework 231 such as Microsoft Silverlight®, which includes an application domain 332 such as Microsoft's common language runtime (CLR). The headless host 230 also includes native application code 234, an execution manager client 235 and a runtime environment such as the Windows® Runtime (WinRT) Platform 236 to communicate with other processes. In some implementations the headless host 230 is generally given access on a priority basis to system resources in order to preserve call quality. Resources are allocated to the processes based on the state of the phone at any given time. In other words, all processes except for those incorporated in the headless host 230 can be compromised if resources are limited.

The background scheduling service 206 (BSS) and the package manager 205 together maintain information concerning the rules that are to be applied for launching the keep-alive and incoming call agents within each VOIP application. The BSS is responsible for initiating the launch of keep-alive agent 152 after every device reboot and periodically thereafter. The BSS also operates in conjunction with the push client service 207 to launch incoming call agents. In particular, the BSS and package manager 205 provide and implement APIs to enable and disable the launching of the keep-alive and incoming call agents upon the occurrence of various events. For instance, the user may disable these agents. In addition, the launching of these agents may be disabled if the VOIP application's license is revoked or the VOIP application is uninstalled. Likewise, the launching of these agents may be enabled when the VOIP application's license is granted.

The push client service 207 is used to notify the incoming call agent that an incoming VOIP call is being received. The push client service 207 is generally pre-existing on the host system and listens for push notifications received by various applications such as e-mail applications and the like. The pre-existing service also includes a registration mechanism which allows the push client service 207 to begin running the appropriate application (e.g., the VOIP application). In this way each VOIP application running on a host system does not need to listen for its own incoming VOIP calls. Rather, a single component that implements the push client service 207 listens for all incoming VOIP calls and upon receipt dispatches them to the appropriate application. As discussed above, the keep-alive agent 152 is responsible for ensuring that the push notification channel remains active.

The navigation model 203 provides events that inform the phone service when the UI of a VOIP application enters or leaves the foreground. These notifications are used by the phone service 208 to hide or show the minimized call UI. The navigation model 203 also provides APIs to the phone service to launch the VOIP application UI.

Example Mobile Device

Figure 3:
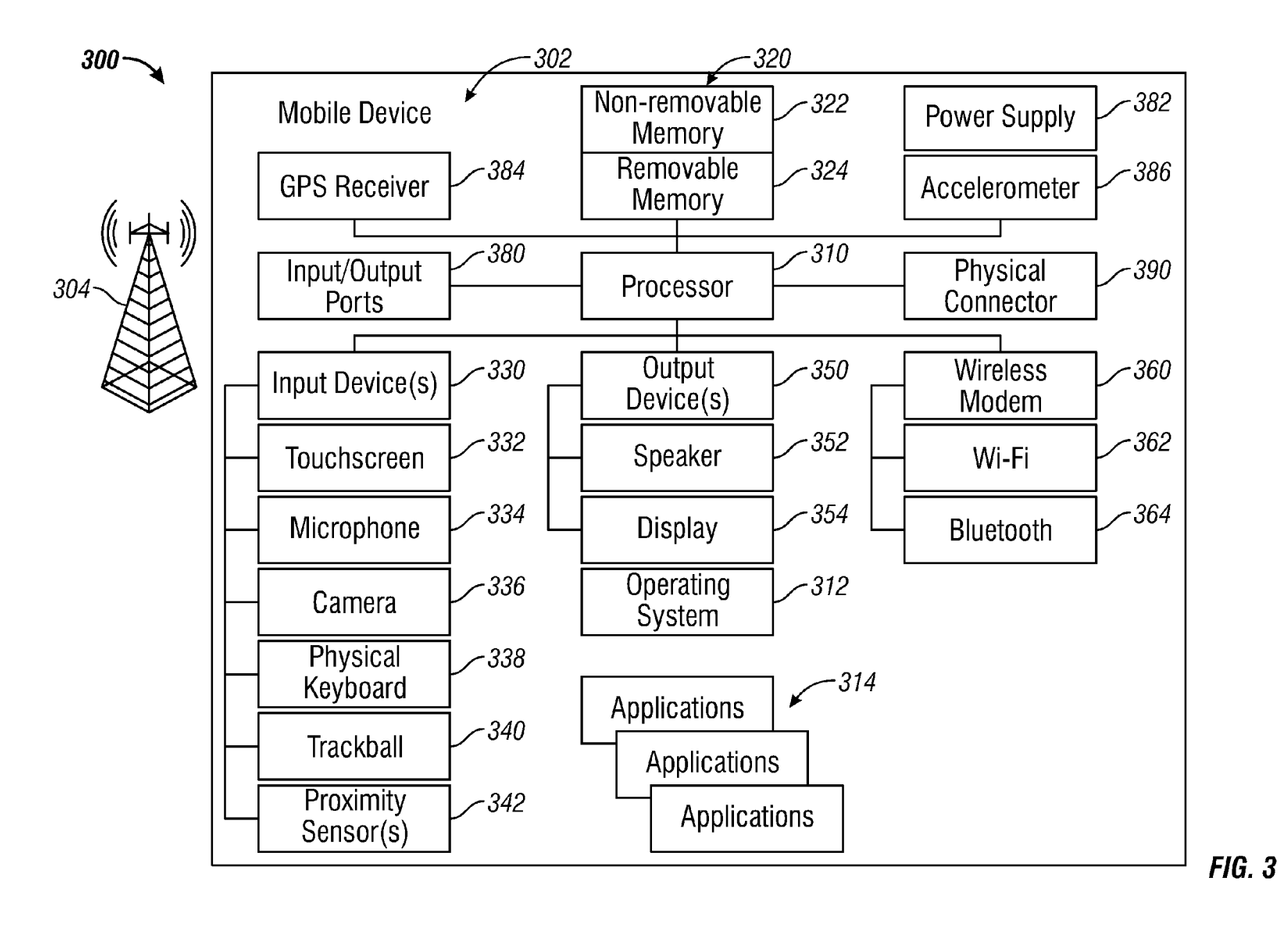
FIG. 3 is a system diagram depicting an exemplary mobile device 100 including a variety of optional hardware and software components, shown generally at 102.

FIG. 3 is a system diagram depicting an exemplary mobile device 300 including a variety of optional hardware and software components, shown generally at 302. Any components 302 in the mobile device can communicate with any other component, although not all connections are shown, for ease of illustration. The mobile device can be any of a variety of computing devices (e.g., cell phone, smartphone, tablet or other handheld computer, Personal Digital Assistant (PDA), etc.) and can allow wireless two-way communications with one or more mobile communications networks 104, such as a cellular or satellite network.

The illustrated mobile device 300 can include a controller or processor 310 (e.g., signal processor, microprocessor, ASIC, or other control and processing logic circuitry) for performing such tasks as signal coding, data processing, input/output processing, power control, and/or other functions. An operating system 312 can control the allocation and usage of the components 302, including power states, above-lock states, and below-lock states, and provide support for one or more application programs 314. The application programs can include common mobile computing applications (e.g., image-related applications, email applications, calendars, contact managers, web browsers, messaging applications), or any other computing application.

The illustrated mobile device 300 can include memory 320. Memory 320 can include non-removable memory 322 and/or removable memory 324. The non-removable memory 322 can include RAM, ROM, flash memory, a hard disk, or other well-known memory storage technologies. The removable memory 324 can include flash memory or a Subscriber Identity Module (SIM) card, which is well known in GSM communication systems, or other well-known memory storage technologies, such as "smart cards." The memory 320 can be used for storing data and/or code for running the operating system 312 and the application programs 314. Example data can include web pages, text, images, sound files, video data, or other data sets to be sent to and/or received from one or more network servers or other devices via one or more wired or wireless networks. The memory 320 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 300 can support one or more input devices 330 for responding to inputs from users and other sources. Such input devices may include a touch screen 332, microphone 334, camera 336, physical keyboard 338, trackball 340, and/or proximity sensor 342, and one or more output devices 350, such as a speaker 352 and one or more displays 354. Other possible output devices (not shown) can include piezoelectric or haptic output devices. Some devices can serve more than one input/output function. For example, touch screen 332 and display 354 can be combined into a single input/output device.

In some implementations the various input devices 330 may support natural user interface (NUI) methods. Examples of NUI methods include those relying on speech recognition, touch and stylus recognition, gesture recognition both on screen and adjacent to the screen, air gestures, head and eye tracking, voice and speech, vision, touch, gestures, and machine intelligence. Specific categories of NUI technologies on which Microsoft® is working include touch sensitive displays, voice and speech recognition, intention and goal understanding, motion gesture detection using depth cameras (such as stereoscopic camera systems, infrared camera systems, red-green-blue camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods).

A wireless modem 360 can be coupled to an antenna (not shown) and can support two-way communications between the processor 310 and external devices, as is well understood in the art. The modem 360 is shown generically and can include a cellular modem for communicating with the mobile communication network 304 and/or other radio-based modems (e.g., Bluetooth 364 or Wi-Fi 362). The wireless modem 360 is typically configured for communication with one or more cellular networks, such as a GSM network for data and voice communications within a single cellular network, between cellular networks, or between the mobile device and a public switched telephone network (PSTN).

The mobile device can further include at least one input/output port 380, a power supply 382, a satellite navigation system receiver 384, such as a Global Positioning System (GPS) receiver, an accelerometer 386, a gyroscope (not shown), and/or a physical connector 390, which can be a USB port, IEEE 1394 (FireWire) port, and/or RS-232 port. The illustrated components 302 are not required or all-inclusive, as any components can be deleted and other components can be added.

Figure 4:
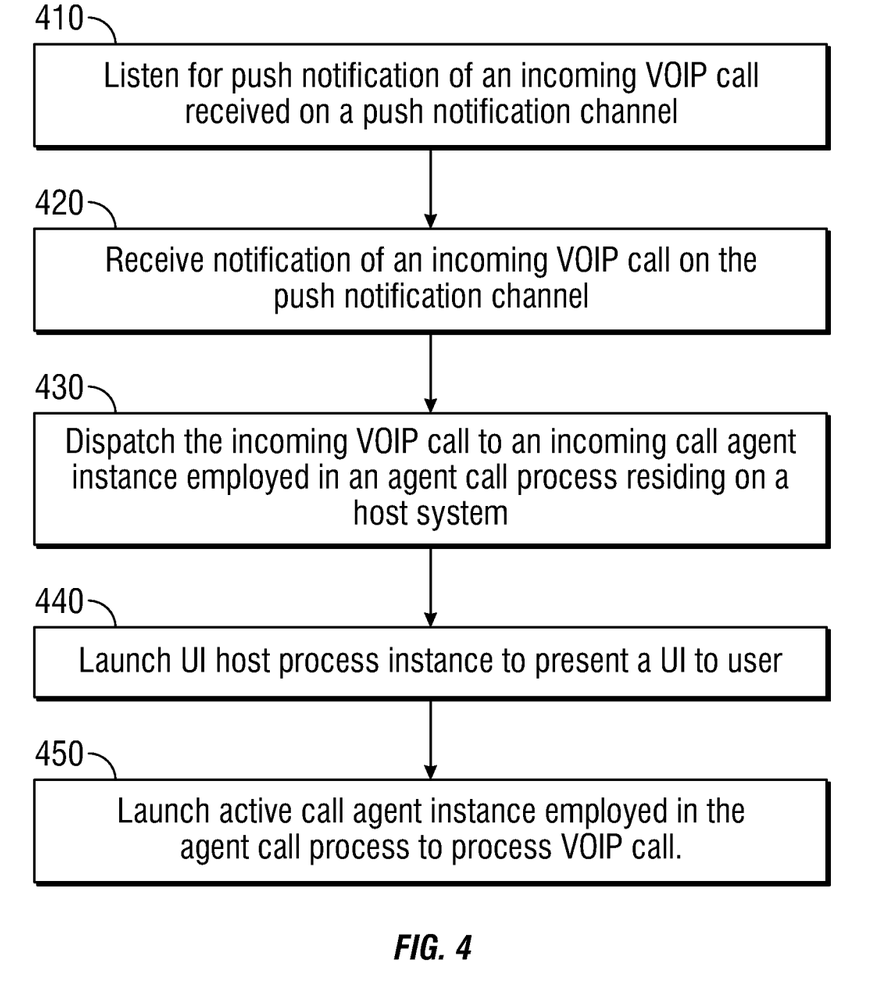
FIG. 4 is a flowchart showing one example of a method for enabling operation of one or more VOIP applications on a host system.

FIG. 4 is a flowchart showing one example of a method for enabling operation of one or more VOIP applications on a host system. The method begins at block 410 where a push notification service associated with the host system listens for push notifications of incoming VOIP call received on a push notification channel. A service notification of an incoming VOIP is received at block 420 on a push notification channel. At block 430, the incoming VOIP call is dispatched to an instance of an incoming call agent employed in an agent host process residing on the host system. An instance of a UI host process is launched at block 440 to present a UI to user on a display of the host system. The UI host process will generally perform a variety of tasks, including displaying the incoming call, playing a ringtone and waiting for the user to accept or reject the call. In response to user acceptance of the VOIP call, an instance of an active call agent employed in the agent call process is launched for processing the VOIP call. The agent call process runs as either a foreground or background process for the duration of the VOIP call.

The claimed subject matter may be implemented as a method, apparatus, or article of manufacture using standard programming and/or engineering techniques to produce software, firmware, hardware, or any combination thereof to control a computer to implement the disclosed subject matter.

For instance, the claimed subject matter may be implemented as a computer-readable storage medium embedded with a computer executable program, which encompasses a computer program accessible from any computer-readable storage device or storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). However, computer readable storage media do not include transitory forms of storage such as propagating signals, for example. Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented system that facilitates implementation of one or more VOIP applications, comprising: a host system; a user interface (UI) residing on the host system and configured to receive user input, and based at least on the user input, initiate and control VOIP calls, the UI being rendered by the host system when the UI is executed as a foreground process; an agent host residing on the host system and configured to process a VOIP call received by one or more VOIP applications executable on the host system, said agent host being alternatively executable as a foreground and a background process and running as a foreground or background process for a duration of the VOIP call to: communicate with a VOIP server associated with the VOIP application; capture content from at least one input device associated with the host system; and render content on an output device associated with the host system while an instance of the UI host operates in the foreground, the captured content and the rendered content communicated as part of the VOIP call, and the agent host running in the background while the UI is not operating as a foreground process and otherwise running alternatively in the foreground or background while a VOIP call is in progress, thereby conserving system resources.

2. The computer-implemented system of claim 1 in which the UI is further configured to deliver call control commands to the agent host and to create a surface on which incoming video is rendered by the agent host.

3. The computer-implemented system of claim 1 in which the host system includes a mobile phone.

4. The computer-implemented system of claim 1 in which the agent host is operational as a background process to (i) process incoming call notifications, (ii) periodically send keep-alive messages to the VOIP server, and (iii) process a VOIP call that is in progress when the UI is not operating as a foreground process.

5. The computer-implemented system of claim 1 in which the host system includes infrastructure for rendering, outputting and storing media communication during a cellular call and VOIP call, said infrastructure exposing APIs for use by the active call agent instance to provide audio and/or video capture and playback.

6. The computer-implemented system of claim 1 in which the host system includes an execution model component for allocating hardware resources, said execution model component exposing APIs to launch and control instances of agents employed in the agent host.

7. The computer-implemented system of claim 1 in which the agent host runs as a background process for processing a VOIP call when a user navigates away from the VOIP application so that the UI is not running as a foreground process.

8. The computer-implemented system of claim 7 in which the UI is only executed as a foreground process and is terminated when the user navigates away from the VOIP application.

9. The computer-implemented system of claim 1 in which the agent host includes a keep-alive agent for periodically communicating with VOIP server.

10. The computer-implemented system of claim 1 in which the agent host includes an incoming call agent for receiving notification of an incoming VOIP call on a push notification channel and in response thereto, requesting display of an incoming call dialog box.

11. The computer-implemented system of claim 10 in which the agent host includes an active call agent for processing the phone call using the infrastructure APIs to capture and play video and/or audio communicate during the VOIP call.

12. The computer-implemented system of claim 11 in which a phone service causes the active call agent to be launched upon receipt of the notification of an incoming VOIP call.

13. The computer-implemented system of claim 12 in which the execution model component terminates an instance of the incoming call agent after initiating an instance of the active call agent.

14. The computer-implemented system of claim 6 in which the execution model component allocates hardware resources to the agent host process on a priority basis to preserve call quality.

15. The computer-implemented system of claim 9 in which the host system includes a push client service listening for notification of incoming VOIP calls and dispatching incoming VOIP calls to a call agent of one of the VOIP applications, the keep-alive agent communicating with the VOIP server to maintain a push notification channel on which the notification of the incoming VOIP call is received.

16. A method for enabling operation of one or more VOIP applications on a host system, comprising: listening for push notification of an incoming VOIP call through a push notification service received on the push notification channel; receiving notification of an incoming VOIP call on a push notification channel; dispatching the incoming VOIP call to an instance of an incoming call agent employed in an agent call process residing on a host system that provides the push notification system; launching an instance of a UI host process to present a UI to a user on a display of the host system, the UI being rendered by the host system when the UI is executed as a foreground process; and in response to user acceptance of the VOIP call, launching an instance of an active call agent employed in the agent call process for processing the VOIP call, the agent call process being alternatively executable as a foreground and a background process and running as a foreground or background process for a duration of the VOIP call, the agent call process running in the background when the UI interface is not operating as a foreground process and otherwise running alternatively in the foreground or background while a VOIP call is in progress, thereby conserving system resources.

17. The method of claim 16 further comprising terminating the instance of the incoming call agent after launching the instance of the active call agent.

18. The method of claim 16 in which the instance of the active call agent is launched in a process in which the instance of the incoming call agent is running and further comprising:

causing the instance of the agent call process to run as a background process in response to user input; and     terminating the instance of the UI host process.

19. A method comprising: establishing a VOIP call using a VOIP application executable on a host system having a VOIP platform that includes a UI host, the UI being rendered by the host system when the UI is executed as a foreground process, and an agent host for processing VOIP calls, the agent host being alternatively executable as a foreground and a background process; receiving input to switch from the VOIP call to another application executable on the host system; and in response to the input, terminating an instance of the UI host process while an instance of the agent host continues to run as a background process for the duration of the VOIP call, the agent host otherwise running alternatively in the foreground or background while a VOIP call is in progress, thereby conserving system resources.

20. The method of claim 19 in which a cellular call is in progress when the VOIP is established and further comprising:

placing the cellular call on hold as a background process when the VOIP is accepted; and     in response to user input, switching from the VOIP call to the cellular call by bringing the cellular call to the foreground and executing the instance of the agent host process as a background process.

* * * * *